United States Patent
Ferguson et al.

(10) Patent No.: US 8,036,485 B2
(45) Date of Patent: Oct. 11, 2011

(54) SYSTEMS AND METHODS FOR MEASURING LOSS OF DETAIL IN A VIDEO CODEC BLOCK

(75) Inventors: Kevin M. Ferguson, Beaverton, OR (US); Jiuhuai Lu, Palos Verdes Peninsula, CA (US)

(73) Assignee: Tektronix, Inc., Beaverton, OR (US)

( * ) Notice: Subject to any disclaimer, the term of this patent is extended or adjusted under 35 U.S.C. 154(b) by 866 days.

(21) Appl. No.: 12/058,474

(22) Filed: Mar. 28, 2008

(65) Prior Publication Data

US 2008/0266427 A1 Oct. 30, 2008

Related U.S. Application Data

(60) Provisional application No. 60/910,817, filed on Apr. 9, 2007.

(51) Int. Cl.
*G06K 9/40* (2006.01)
(52) U.S. Cl. ......................................... 382/266; 382/268
(58) Field of Classification Search .................. 382/266, 382/268, 286, 199, 248, 250
See application file for complete search history.

(56) References Cited

U.S. PATENT DOCUMENTS

| 5,748,788 | A |   | 5/1998 | Moro |
| 5,790,717 | A | * | 8/1998 | Judd ............................ 382/323 |
| 6,829,005 | B2 | * | 12/2004 | Ferguson ..................... 348/180 |
| 2003/0174212 | A1 |   | 9/2003 | Ferguson |
| 2005/0100235 | A1 |   | 5/2005 | Kong et al. |
| 2005/0111542 | A1 |   | 5/2005 | Hattori |

FOREIGN PATENT DOCUMENTS

| WO | 9512178 A | 5/1995 |
| WO | 04002163 A | 12/2003 |
| WO | 2004014084 A | 2/2004 |
| WO | 2007020572 A | 2/2007 |

\* cited by examiner

*Primary Examiner* — Phuoc Tran
(74) *Attorney, Agent, or Firm* — Matthew D. Rabdau; Michael J. Fogarty, III

(57) ABSTRACT

Picture quality measurement systems and methods are provided for measuring DC blockiness within video blocks. Block boundaries are located within a test video frame. The relative AC differences within each block are measured using a reference video frame, a statistically estimated reference or a default value of the white video level divided by two. An objective DC blockiness map, a subjective DC blockiness map or both may be generated.

10 Claims, 6 Drawing Sheets

SYSTEMS AND METHODS FOR MEASURING LOSS OF DETAIL IN A VIDEO CODEC BLOCK

CROSS-REFERENCE TO RELATED CASES

This application claims the benefit of U.S. Provisional Application No. 60/910,817 filed on Apr. 9, 2007, entitled Systems and Methods for Measuring Loss of Detail in a Video Codec Block, which application is hereby incorporated herein by reference

BACKGROUND

Embodiments of the present invention relate to video test and measurement equipment, and more particularly to picture quality measurements for video.

Video compression methods, such as MPEG-2 and H.264 process video a small portion of the picture at a time. These small portions of the picture are often identical sized rectangles called blocks. These blocks are pieced together in a block grid. In the case of lossy, block-based compression methods, blocking impairments manifest themselves within an individual processed block. These blocking impairments correspond to errors caused by loss in the compression method. The highest loss results in total loss of detail, the AC portion of the video signal, within the block. This leaves only a constant, or DC value, for each picture element within the block. Lowest loss corresponds to 100% of the AC portion, which corresponds to the detail, of the video remaining unchanged for each of the channels of video, such as RGB, YUV for example.

While H.264 and other video codecs have optional deblocking filters designed to smooth abrupt edges, which may result from different block DC values, at block boundaries, the blurring due to loss of AC within in a block is still a problem.

The video industry needs a repeatable, verifiable method for both objective measurement and prediction of the subjective rating of the video quality due to this loss. Prior methods have not had defined units of measure, and generally have attempted to measure objective and subjective impairment simultaneously, thus measuring neither. The lack of a traceably defined unit of measure has prevented the prior methods from providing measurement and verification of the accuracy of the measurement results.

The prior art tries to estimate discontinuities at the block boundaries and estimate visibility of these discontinuities, without traceable and verifiable units.

An example of a blockiness measurement that comes close to having traceable and verifiable units is described in *Blind measurement of blocking artifacts in images*, by Zhou Wang et al., Proc. IEEE Int. Conf. Image. Proc., Vol 3, pp 981-984, September 2000. As with many other methods in the prior art, this method uses a relatively computationally expensive, and complex, spectral analysis to uncover periodicity of the block edge energy along vertical and horizontal dimensions. Blockiness is measured as the power of an estimated ideal blockiness signal superimposed on the original signal. While the power can be normalized to give a fully defined unit, as opposed to one relying on the LSB as described, and a synthesized ideal blockiness signal could be generated and super-imposed on a test video signal to verify accuracy of detection, the definition of ideal blockiness signal is itself problematic, as actual blockiness impairments do not generally correspond to the ideal and often video signals have the same spectral signature that the power spectrum method is designed to detect as blockiness. Thus, even if this method were extended to be full reference, the artifact detected is an ideal artifact that has been defined in a somewhat arbitrary way that relies primarily on block boundary discontinuities, which are commonly mitigated via de-blocking filter such as those included in the H.264 standard and sometimes incorporated in other encoder and decoder designs.

Also, for prediction of visibility and corresponding subjective quality rating, this method is illustrative of the prior art in general. A mask estimation is done as a very rough estimation of human vision response, again without traceable and verifiable units, or accuracy. In effect, visibility is not estimated directly, but rather relative visibility is estimated.

Other prior art methods exist with variations on the theme of finding block edges in the time, or frequency, domain, estimating the edge amplitude and taking the norm of these amplitudes, with or without masking estimates.

Automated methods of measuring DC blockiness with full reference and no reference would be useful. These methods could include compression information such as exact block boundary locations, or not. These methods would be desirable if they had traceable and verifiable units and accuracy, with results being either fully objective, or fully predictive of subjections assessment of the DC blocking impairments. It would also be desirable that the method have computational efficiency, such that it would have relatively low processing overhead for a given level of accuracy.

SUMMARY

Accordingly, embodiments of systems and methods are provided that take advantage of the use of a reference video sequence if present, but still create useful measurements in the event no reference is present.

Embodiments of the present systems and methods include bounded and verifiable units ("% DC Blockiness") allowing robust measurement accuracy verification, exact measurement for full reference and for 0% DC blockiness using the no reference method with correspondingly generated impaired test video clips, as opposed to the prior art methods' estimation based methods. The method also has low computational expense, allowing it to be competitive for speed versus cost relative to prior art.

Various embodiments of the present invention provide traceable and verifiable units and accuracy. The results may be either fully objective, or subjective predictions of the visibility of the blocking impairment. Embodiments of the present invention are able to accomplish the results with relative computational efficiency, meaning relatively low processing for the given accuracy. The ability to compare, using the same units, measurement results from no reference measurements against measurement results from full reference measurements is also possible.

Deblocking filters may effect the blocking edge location measurement, but in many applications this information is already available. In this case this method is immune from effects of deblocking filters which render prior art methods fairly useless.

Embodiments of the present method also does not depend on any "ideal" artifact which has been pointed out as problematic, but rather uses the reference as the ideal signal and measures the deviation from ideal.

DETAILED DESCRIPTION

Figure 1:
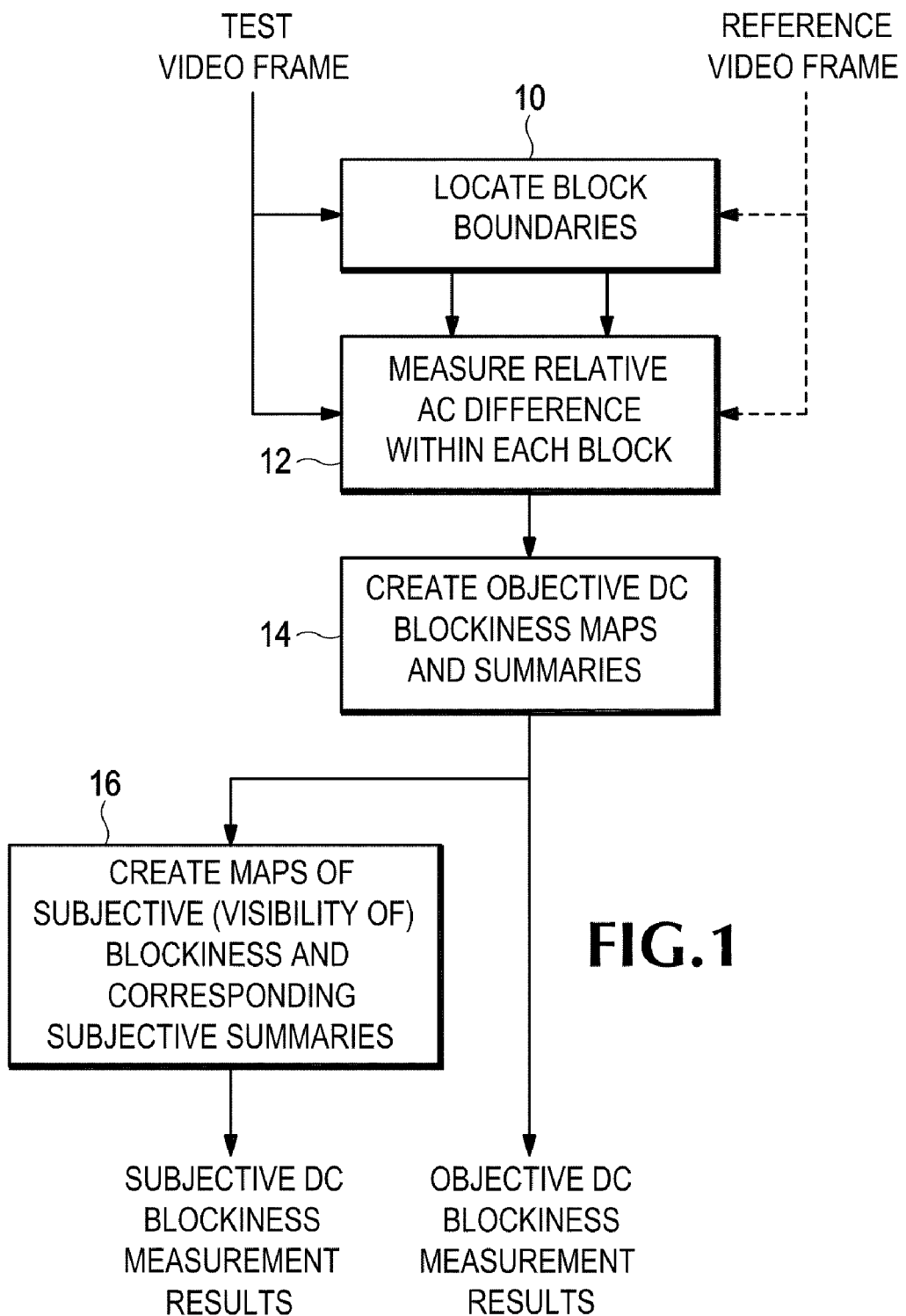
FIG. 1 is a block diagram of a system for measuring DC Blockiness.
Figure 2:
FIG. 2 is a video frame showing a block impairment.
Figure 3:
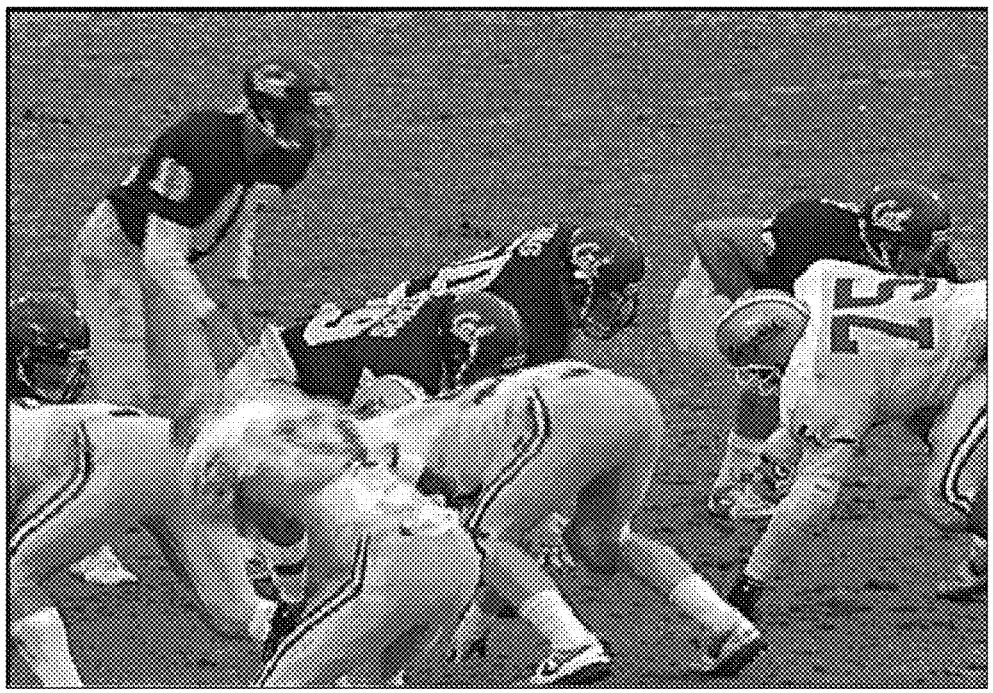
FIG. 3 is a video frame as in FIG. 2, but without the impairment.

The present invention is shown in block diagram form in FIG. 1. This apparatus processes an input video under test such as the block impaired image of FIG. 2. For purposes of illustration the block impaired image of FIG. 2 has been shown using a somewhat extreme level of blockiness. If available, the corresponding reference, for example as shown in FIG. 3, is also input. The output includes per block measurement depicted in the DC blockiness map shown in FIG. 4 and summary measurements per frame or entire video sequences as plotted in FIG. 5.

Embodiments of a test and measurement system according to the present invention perform the following processes as shown in FIG. 1. The reference video frame is shown connected using a dotted line as this is optional.

Figure 4:
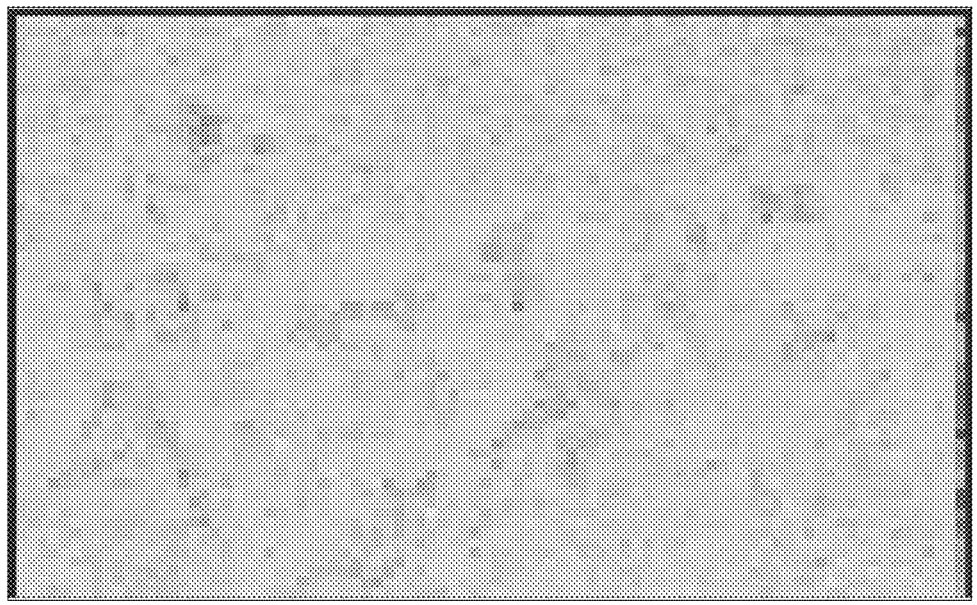
FIG. 4 is a DC Blockiness Map
Figure 5:
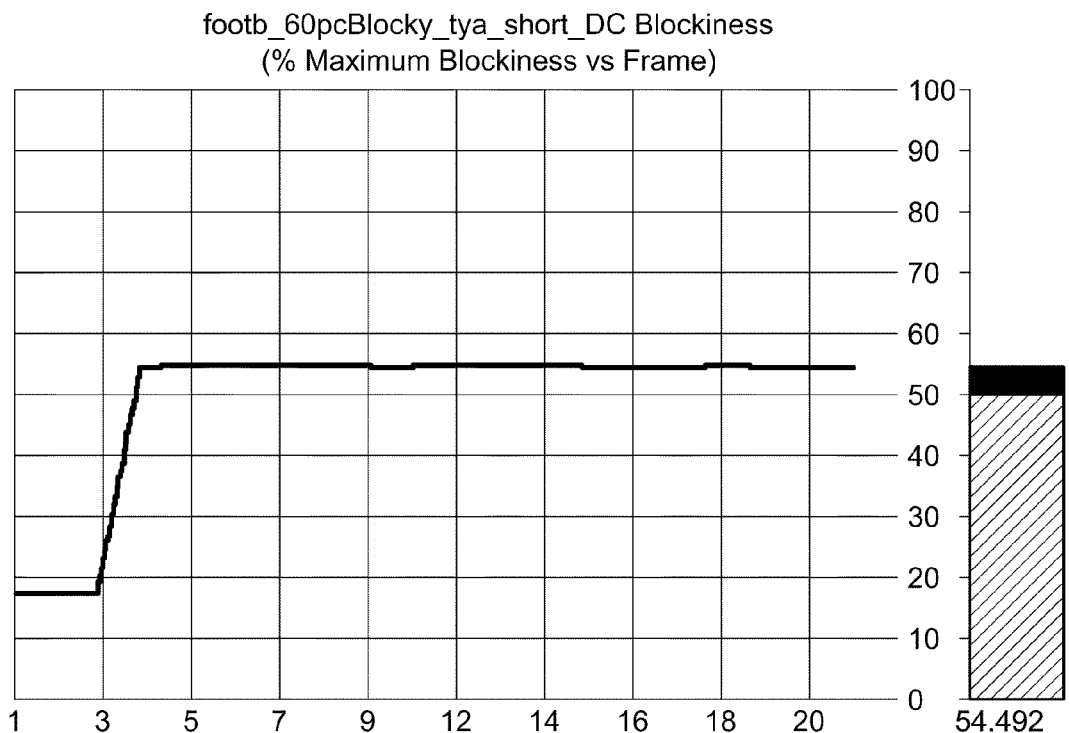
FIG. 5 illustrates DC Blockiness summary measures per frame along with a bar graph for the last frame.

An objective blockiness measurement per block is performed, and produces for example a DC blockiness map, as shown in FIG. 4. These block measurements may be averaged to yield an objective measurement per frame, or per video sequence. In addition, a subjective blockiness prediction may be produced. The block measurements represented by the DC blockiness map may be applied per image block as a weighting of subjective image response maps and then pooled for a subjective quality rating as described in U.S. Pat. No. 7,102,667, entitled Picture Quality Diagnostics for Revealing Cause of Perceptible Impairments, which is hereby incorporated by reference herein.

At step 10 locate block boundaries. A variety of existing methods may be used for locating block boundaries. These methods typically fall into either methods that determine block boundaries directly from compressed video parametric description, which may be provided as metadata; or methods that determine block boundaries indirectly by measuring or estimating block boundaries. For example the block grid parameters may be determined by finding discontinuities with regular periodicity along each of the horizontal and vertical dimensions.

At step 12, the relative AC difference within each block is measured. For each channel of video being measured, calculate the % DC Blockiness at each pixel within the block as:

$$\text{Raw } DC \text{ Blockiness} = 100\% * (|\text{Ref}Ac - \text{Test}Ac|) / \text{Greater}(1 \text{ LSB}, |\text{Ref}Ac|) \quad \text{Eqn 1}$$

where
TestAc=(meanBlockTest−Test)
RefAc=(meanBlockRef−Ref)
Greater(1 LSB, RefAc)=RefAc or 1 LSB if RefAc<1 LSB, to avoid a division by 0.

For example, if the channel being measured is the Y (luminance) channel of YCbCr video,
Test=the value of Y for the test video pixel within a given block of a given test video frame.
Ref=the value of Y for the reference video pixel within a given block of a given reference video frame.
meanBlockTest=mean value of Y for test video within a given block of a given test video frame.
meanBlockRef=mean value of Y for reference video within a given block of a given reference video frame.

For no reference (single-ended) measurement, RefAc is estimated statistically from other example video of the same format, genre, etc. if available. If no statistical information is available, a default value of (whiteVideoLevel/2) is used. For example, for 8 bit video with a nominal range of 16 to 235, by default, RefAc=109.5. This corresponds to the statistical mean of all possible differences between adjacent pixels, where the probability distribution function for the differences is constant. This, assumes there are no Nyquist sampling constraints This pixel-wise value is clipped to yield the DC Blockiness measured at each pixel:

$$\text{Pixel}Dc\text{Blockiness} = \text{clip}(\text{Raw } DC \text{ Blockiness}, 0\%, 100\%)$$

Where clip(x,a,b)=a if x<a, b if x>b and x otherwise.
This is calculated for each pixel within a given block, for each block in a grid of blocks with grid coordinates {r,c} for row and column respectively. Thus, blockiness value per block at row=r and column=c is given as $$Dc\text{BlockinessAtBlock}[r][c] = \text{Mean}(\text{Pixel}Dc\text{Blockiness})$$

At step 14, for producing objective DC Blockiness maps and measurement summaries, the DC blockiness value per region of interest (ROI) {image (video field or frame) and likewise for the entire video sequence} is given as the mean of all blockiness values:

$$Dc\text{Blockiness} = \text{mean}(Dc\text{BlockinessAtBlock}[r][c])$$

To help illustrate the meaning of the DC Blockiness measure, solving for TestAc in terms of RefAc and DC Blockiness we get $$\text{Test}Ac = \text{Ref}Ac * (1 - DC\text{Blockiness}/100\%) \quad \text{Eqn 2}$$

Note that impairments may be created synthetically by using equation 2. In some embodiments, this will produce a DC Blockiness impairment to within LSB quantization error. So a measurement of DcBlockiness=0% corresponds to TestAc=RefAc which corresponds to no blurring or edge block artifacts, also referred to as no impairment.

DcBlockiness=100% corresponds to TestAc=0 which corresponds to a 100% blurred block.

Corresponding objective maps may be created by copying the DcBlockinessAtBlock[r][c] into the corresponding block of a DC blockiness image map as shown in FIG. 4. Note, however, that in cases where RefAc=0 (pixels equal to the block mean) for example "flat" areas, synthetically generated impairments used for verification will also have corresponding pixels TestAc=0, so Raw DC Blockiness=0 for these pixels. As a result, in the general case of video processed to have P % DC Blockiness, the actual % DC Blockiness will be <P %. This is illustrated in the example of FIGS. 2, 3, 4 and 5. The image of FIG. 3 was artificially impaired using equation 2 with DCBlockiness=60%, resulting in the image in FIG. 2.

Note that the corresponding DC Blockiness map in FIG. 4 has some blocks darker than others. The darker blocks correspond to "flat" areas within the original reference block (RefAc<1 LSB). This is reflected in the average for the frame and sequence as well, reflected in the plot showing approximately 55% blockiness of FIG. 5.

In addition to providing objective DC blockiness measurement results, as shown at step 16, in some embodiments a subjective DC blockiness measurement is also provided. Prediction of subjective ratings of the video quality due to DC blockiness may be provided, for example.

DcBlockinessAtBlock[r][c] values from step 3 are applied per image block as a weighting of subjective image response maps and then pooled for a subjective quality rating. The subjective image response maps correspond to the difference for the full reference case or the perceptual contrast for the no reference case.

Traceable and verifiable units of % DC Blockiness defined by equation 1 with test signal generation for verification using equation 2 are provided. Methods of verification are analogous to the example given using artificially blocked video, except that the verification video has no "block average" pixels, thus preventing the TestAc=0 case.

In embodiments of the present method, the locating of block boundaries, referred to above as step 10, is achieved according to the following methodologies:

Conventionally, there are three types of video quality measurement methods. They are the measurements that require the clean copies of the original source pictures (full reference measurement), the measurements that require partial information about the source video (reference-reduced measurement), and the measurements that do not require the original video (reference-free measurement). Reference-free and reference-reduced video quality estimation relies on the ability to detect visual patterns uniquely associated with video degraded by lossy compression and transmission errors. The methods described herein are for artifact detection purposes. They identify and localize one of the most common types of digital picture degradation, the blocking structures, or blockiness.

Embodiments of the methods not only identify the blocking degradation, but also perform detection in a robust way. In addition, some embodiments are able to localize the blocking structure, which is important especially for subsequent blurring identification that may be applied on locations where blocking degradation is not present. In summary, embodiments of the method provide detection robustness, in particular, the resistance to scenes containing synthetic, graphic structures, or text; the ability to determine the size of the blocky structure; or both in some embodiments.

Embodiments of the present method utilize the following techniques: separable 2-D blockiness detection filter, determination of the blockiness size, or combinations thereof.

Figure 6:
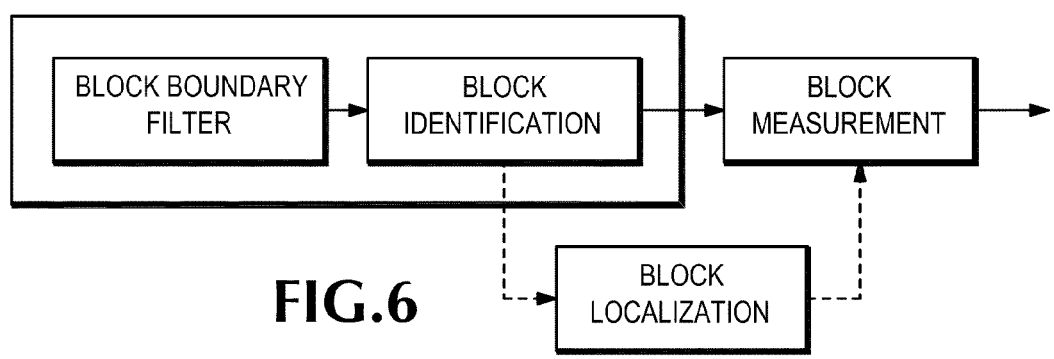
FIG. 6 is a block diagram of an embodiment of locating block boundaries.

The general framework of blockiness identification and measurement framework is illustrated in FIG. 6. The block boundary filter and block identification are the components that the method described herein is developed for. The blocking structure detection is performed on a selected set of picture frames of a video sequence. The specific way of selecting the picture frames is not defined in this invention disclosure and is irrelevant to the method disclosed here. The technique does not impose any limitation on the format or the dimensions of the digital video. The technique only requires the luminance data of a digital video sequence.

The block boundary filter extracts block boundaries. Since the block degradation is identified by the box-like block boundaries, this step lets block boundaries standout in the picture. The ideal block boundary filter would be a filter that can identify the edges of every blocking artifact while completely ignoring edges from objects in the picture content. Embodiments of the present method utilize a 2-D block boundary filter.

The 2-D separable filer is designed to extract the blocking structure in a picture. The 2-D filter is given by the matrix representation as follows.

$$B = K \begin{bmatrix} 1 & -3 & 3 & -1 \\ -3 & 9 & -9 & 3 \\ 3 & -9 & 9 & -3 \\ -1 & 3 & -3 & 1 \end{bmatrix}$$

where K is any non-zero constant. This is a separable filter that can be written as:

B=K[1 −3 3 −1]$^T$[1 −3 3 −1] where T indicates a transpose operation.

In other words, the above 2-D filter is equivalent to applying the 1-D filter, [1 −3 3 −1], twice, once vertically and once horizontally. In implementation where the number of bits to hold B is an issue, K should be chosen properly so that the values stored in B is within a manageable numerical range.

Figure 7:
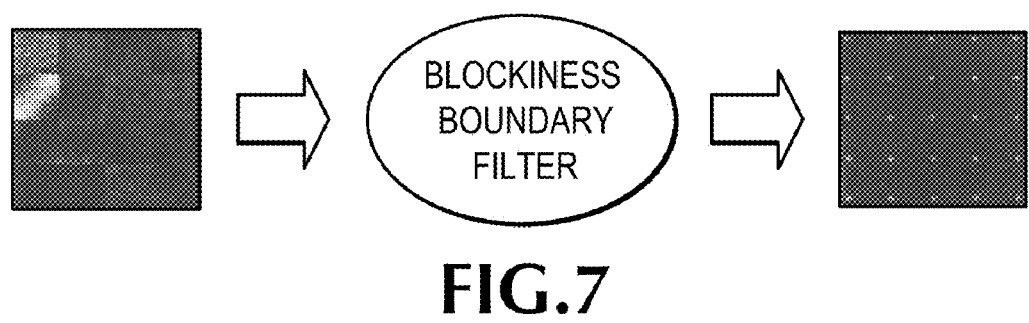
FIG. 7 illustrates application of a blockiness boundary filter.

This filter is optimized to detect step function at the corners of a block. Previously known blockiness detection methods use generic edge extraction to detect the block boundaries, which is not optimized for the type of step edges characterizing the block boundaries and therefore is easily subject to interference of edges from video content. By applying a 2-D filter specialized for step edges, the detector is able to minimize the interference to block detection from edges of synthetic and graphical structures in picture content to. This measure has been proved to improve detection robustness significantly. The effect of this 2-D blockiness boundary filter is illustrated in FIG. 7.

Embodiments also provide for the use of the 1-D filter K[1 −3 3 −1] to detect blockiness boundary for both identification and measurement of blockiness severity.

To apply the filter, the following convolution is used, $I_B = |I(x,y) \otimes B(x,y)|$ where I is the picture array, and $I_B$ is the block boundary map that contains the extracted block features to be used for block identification in the next step, and the operator "⊗" stands for 2-D convolution, and the sign is removed, as denoted by the | | symbol.

Block identification is the subsequent step where the existence of the blocking degradation is to be judged based upon the blockiness boundaries detected by the blockiness boundary filter as described above.

The existence of blocking artifact is determined using cross-correlation between two data segments of the blockiness image. The selection of the data segment is described below among other operations. The steps described below are used to determine the existence of blocking artifact and the dimensions of the blocks. It assumes the horizontal and vertical dimensions are equal. However, if this assumption does not stand, the procedure described below may be taken for each dimension separately in order to compute the dimensions. Nevertheless, the determination of blocking existence is based on the computation of the horizontal dimension.

Figure 8:
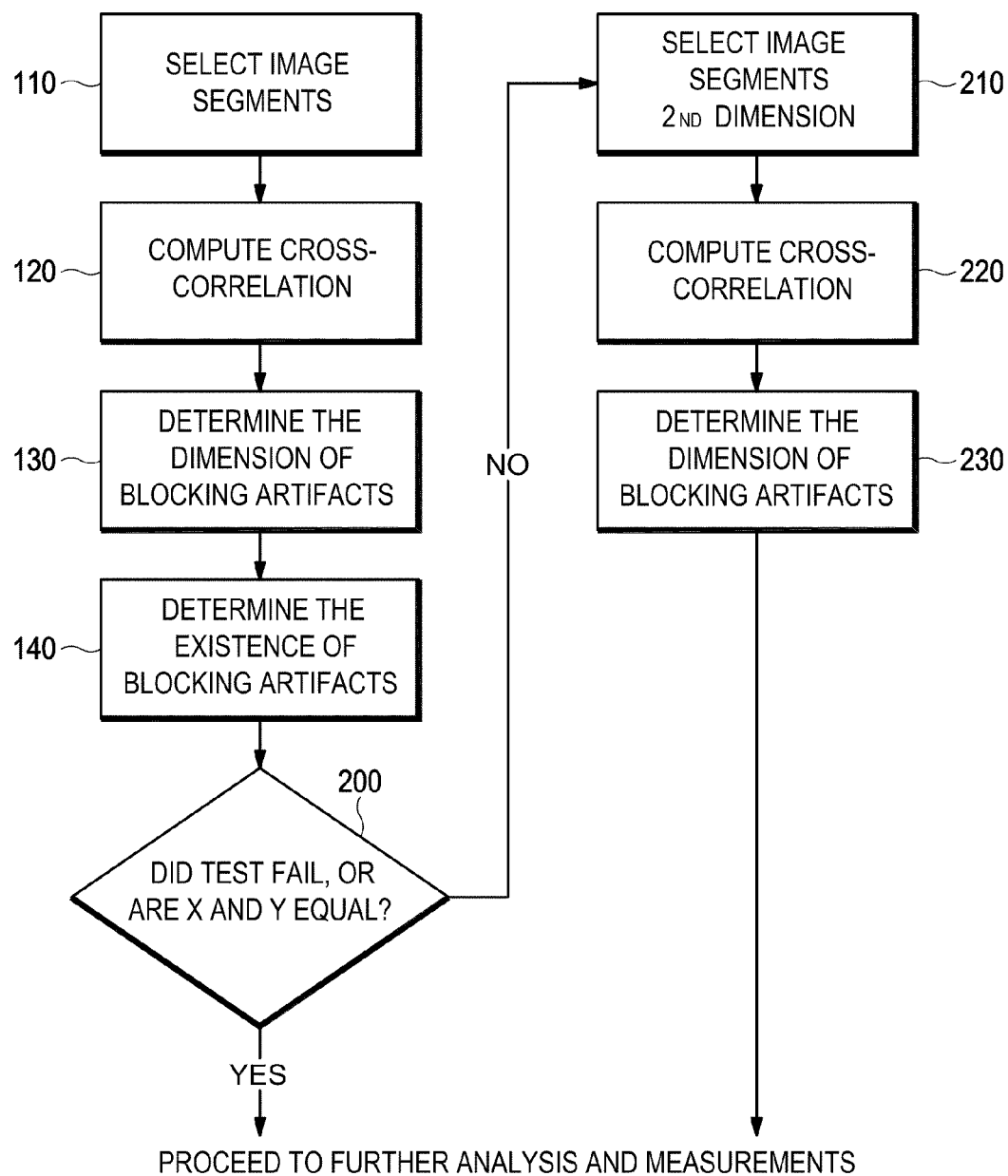
FIG. 8 is a block diagram of an embodiment of block identification.

In the following steps, some 2-D blockiness edge segments are first converted to a 1-D data series by averaging the values of blockiness boundary edge strength, along each column in a rectangular segment. This data reduction measure has been reported in literature and therefore is not described in great detail here. This data reduction, however, is used both in an entire picture and in one segment of the picture. If the equal dimension assumption does not stand, the computation of Y dimension requires the averaging to be taken along each row. This approach is described below in reference to FIG. 8.

As provided at step 110 image segments are selected. A picture is first divided into 2 rows and 3 columns of rectangular segments, or divided in such a way that each of the dimensions is larger than 100 pixels. Data reduction operation is performed in each of the segments, which, for example, yields six 1-D data series, $e_i$, i=1, . . . , 6 for an image with height of at least 200 pixels and width of at least 300 pixels. The two segments that have the maximum variance var($e_i$), are selected for the operations in Step 2, For CIF video frames, i,e. 352×288 per frame, it means a 3×2 segments. For QCIF video frames, i.e. 176×144 per frame, it means there are only two segments.

| $e_1$ | $e_2$ | $e_3$ |
|---|---|---|
| $e_4$ | $e_5$ | $e_6$ |

As shown at step 120 a cross-correlation is computed. For the two selected series $e_i$ and $e_j$, one of them is truncated to 40 pixels in length. It does not affect generality to let $e_j$ be the truncated series. A shorter series allows sufficient length of the valid range of cross-correlation. The cross-correlation is computed between $e_i$ and $e_j$: $r_{xy}(e_i,e_j)$.

At step 130 the dimension of blocking artifacts is determined. Typically the dimensions of blocking are 8×8 or 16×16. In order to include the cases where video is scaled by decoders possibly as a part of post-processing, the horizontal and vertical dimensions should be assumed to be unknown, but within a numerical range. An example used here and also in the following discussion is a blockiness size from 6 to 20. The key to determining the blocking size is to find the dominating frequency in the cross-correlation computed in Step 2. Rather than using one of the classical spectrum analysis methods, the method described here is a simpler process for the purpose of this blocking size estimation. The significance of an estimate will be verified in Step 4.

i). For each value h in the [6,20]
ii). Compute the sample averages $m_{h,k}$ $$m_{h,k} = \sum_{i=0,\ldots n} (x_{k=i*h}), n = \left[\frac{L-k}{h}\right]$$

where [ ] stands for truncating to integer, such that n is an integer, L is the length of the cross-correlation series, and k (k=0, . . . , h−1) is an offset.

iii). Find the maximum of the sample averages at each given h across all k.

$$m_h = \text{MAX}(m_{h,k})$$

iv). Find the maximum and the second maximum $m^*_1$ and $m^*_2$ of the averages across all h and record h* that produces that maximum.

$$m^*_1 = \text{MAX}(m_h)$$

At step 140 the existence of blocking artifacts is determined. The criterion to examine the estimate from Step 3 is $m^*_1 > \frac{2}{3} m^*_2$.

At step 200 a decision is made. If no blocking artifacts are determined to exist based on the estimate of step 140, or if the block dimension in X and Y are assumed to be equal, proceed to further analysis and measurement. However, if X and Y are assumed to be not equal, then determine the blocking size along Y direction.

Step 210 corresponds to step 110 with data reduction performed along each rows, for example in the example given here.

Step 220 corresponds to step 120 and step 230 corresponds to step 130.

Subsequent analysis and measurement proceeds at step 20 from FIG. 1, followed by the creation of objective DC blockiness maps and summaries, subjective blockiness maps and summaries, or the creation of both objective and subjective results.

What is claimed is:

1. A method of measuring DC blockiness within video blocks comprising:
    locating block boundaries of a test video frame;
    measuring relative AC differences within each block;
    creating an objective DC blockiness map based upon the relative AC differences; and
    creating a subjective blockiness map based upon the objective values applied per image block.

2. The method of claim 1, wherein locating block boundaries comprises:
    applying a block boundary filter to the test video frame; and
    employing block identification to determine the existence of blocking degradation.

3. The method of claim 2, wherein block identification comprises:
    selecting image segments along a dimension following application for the block boundary filter;
    computing a cross-correlation of the image segments;
    determining x and y dimensions of blocking; and
    determining existence of blocking artifacts.

4. The method of claim 3, further comprising repeating the steps of selecting the image segments, computing the cross-correlation and the determining dimensions of blocking along a second dimension when the block dimensions are not equal.

5. The method of claim 1, wherein the step of measuring relative AC differences within each block comprises comparing pixels from a given block of a test video frame against corresponding pixels from a given block of a reference video frame.

6. The method of claim 1, wherein the step of measuring relative AC differences within each block comprises comparing pixels from a given block of a test video frame against a statistically generated reference.

7. The method of claim 1, wherein the step of measuring relative AC differences within each block comprises comparing pixels from a given block of a test video frame against a default value of white video level divided by two.

8. The method of claim 1, wherein the step of creating an objective DC blockiness map comprises calculating the percentage DC Blockiness at each pixel within each block for each channel of video being measured to determine raw DC blockiness; clipping the raw DC blockiness; and calculating the mean of the clipped DC blockiness for each block in a grid of blocks.

9. The method of claim 1, wherein the step of creating a subjective DC blockiness map comprises applying the DC blockiness values per image block as a weighting of a subjective image response map, wherein the subjective image response map corresponds to the difference between a test video frame and a reference video frame.

10. The method of claim 1, wherein the step of creating a subjective DC blockiness map comprises applying the DC blockiness values per image block as a weighting of a subjective image response map, wherein the subjective image response map corresponds to the perceptual contrast where no reference video frame is available.

* * * * *